United States Patent [19]
Opheij

[11] Patent Number: 5,204,516
[45] Date of Patent: Apr. 20, 1993

[54] PLANAR OPTICAL SCANNING HEAD HAVING DEFICIENCY-CORRECTING GRATING

[75] Inventor: Willem G. Opheij, Eindhoven, Netherlands

[73] Assignee: U.S. Philips Corporation, New York, N.Y.

[21] Appl. No.: 728,440

[22] Filed: Jul. 11, 1991

[30] Foreign Application Priority Data

Apr. 23, 1991 [EP] European Pat. Off. ........... 91200972

[51] Int. Cl.⁵ .............................................. G01J 1/20
[52] U.S. Cl. .............................. 250/201.5; 369/44.12; 359/573; 385/37
[58] Field of Search ............... 250/216, 201.5; 385/10, 385/37, 130-132; 369/44.12, 44.23, 44.14, 109; 359/571, 573, 574, 575

[56] References Cited

U.S. PATENT DOCUMENTS

| | | | |
|---|---|---|---|
| 4,779,259 | 10/1988 | Kono et al. | 385/37 |
| 4,935,911 | 6/1990 | Ohuchida et al. | 369/44.12 |
| 4,991,919 | 2/1991 | Nishiwaki et al. | 385/37 |
| 5,070,488 | 12/1991 | Fukushima et al. | 385/37 |
| 5,081,615 | 1/1992 | Sunagawa | 385/37 |

FOREIGN PATENT DOCUMENTS 0394461 10/1990 European Pat. Off. .
0426248  5/1991 European Pat. Off. .

*Primary Examiner*—David C. Nelms
*Assistant Examiner*—K. Shami
*Attorney, Agent, or Firm*—David R. Treacy

[57] ABSTRACT

A planar optical head is described with a corrected input grating for scanning a surface, for example, a recording surface (2) in an optical record carrier (1). A radiation source (5) supplies a beam (6) which is coupled into a waveguide (9) by an input grating (7) and is formed to a focused scanning beam (11) by an output grating (10). Deficiencies of the radiation beam such as the non-round cross-section of the beam, astigmatism and wavelength variations caused by the radiation source can be corrected by means of an adapted grating structure of the input grating.

17 Claims, 5 Drawing Sheets

PLANAR OPTICAL SCANNING HEAD HAVING DEFICIENCY-CORRECTING GRATING

CROSS-REFERENCE TO RELATED APPLICATION

This application is related to my concurrently filed U.S. Ser. No. 07/728,439, now U.S. Pat. No. 5,146,080, for a Planar Optical Scanning Head.

BACKGROUND OF THE INVENTION

The invention relates to an optical head for scanning a surface, which head is provided with a source supplying a radiation beam, an input grating having a periodic grating structure for coupling the radiation beam as a deflected beam into a waveguide, and an output grating for coupling radiation out of the waveguide and for directing said radiation in the form of a scanning beam onto the surface. Such an optical head can be used in apparatuses for inspecting surfaces in which, for example, contours in a surface are scanned. An example of such an apparatus is a scanning microscope. The head can also be used in a device for scanning recording layers in an optical record carrier. The head can be used for writing and reading the recording layer.

An optical scanning head of the type described in the opening paragraph is known from European Patent Application no. 0,357,780. In this optical head the radiation from the source is coupled into the waveguide via a circular input grating and is subsequently focused on a record carrier via an output grating. The use of a waveguide in this so-called planar head provides the possibility of giving it a very compact form. The waveguide increases the cross-section of the radiation beam from the radiation source to the cross-section of the output grating so that a good quality of the focus spot formed by the scanning beam on the surface to be scanned is obtained. If no use is made of a planar optical system, the desired cross-section of the radiation beam must be realised by making use of the divergence of the radiation beam or by widening the beam. In the first-mentioned case the optical head will be long because the divergence of most laser diodes which are used as radiation sources in optical heads is small. In the second case an extra component is required because a beam expander has at least one lens. When using a planar optical system, the conventional lenses may in principle be dispensed with so that the optical head becomes smaller and lighter.

In the optical head according to the above-mentioned European Patent Application deviations which may occur in the radiation beam from the source are not taken into account. The laser diode which is conventionally used as a radiation source in optical scanning devices supplies a radiation beam having a number of deficiencies. In the first place the cross-section of the radiation beam is not circular. A circular input grating will therefore not be irradiated throughout the surface. The radiation in the waveguide under the input grating will partly leak away due to the presence of the grating. The non-irradiated part of the grating has no function during coupling in, but it does increase the loss of radiation in the waveguide. In the second place the wavefront of the radiation beam from the source is generally astigmatic. Astigmatism deteriorates coupling in and coupling out of the radiation; moreover, it has a detrimental influence on the quality of the focus formed by the scanning beam. In the third place the wavelength of the laser diode may vary as a result of variations in temperature of and the current through the laser diode. The operation of gratings is greatly dependent on the wavelength. The known input grating will therefore no longer couple radiation into the waveguide in the case of a small variation of the wavelength.

SUMMARY OF THE INVENTION

It is an object of the invention to provide a planar optical head which is adapted to said deficiencies of the radiation beam.

The optical head according to the invention is characterized in that the input grating is configured to provide at least one correction for deficiency of the radiation beam. This optical head is distinguished from the known heads not only by its extra provisions but also by the special way in which these provisions have been realised. The deficiencies of the radiation beam could be compensated for by adding extra components to the optical head, such as prisms and oblique plates or lenses introducing astigmatism. In the optical head according to the invention these correction are performed by the input grating, an element which is already present in the optical head for other functions. This provides the possibility of implementing the optical head with fewer elements, which leads to a simpler and more compact construction.

It is to be noted that European Patent Application no. 0,116,896 describes an optical system with a laser diode and a holographic lens in which the lens changes a characteristic property of the radiation beam from the diode laser. The changes relate to the elliptical cross-section and the astigmatism of the beam. The described solutions are specific of an optical system comprising separate components and in the planar optical technology they do not provide an optimum solution due to the completely different requirements imposed in the planar optical technology. The function of the input and output gratings-only comparable at one point with that of a collimator lens and an objective lens-cannot be performed with ordinary lenses. Consequently, the construction of and the requirements imposed on these gratings differ considerably from those of ordinary or holographic lenses. For example, the compensation of the elliptical cross-section of the radiation beam is realised by causing the laser diode to irradiate the lens obliquely. The planar optical system provides a better solution, with no kink in the optical axis of the system being required.

A special embodiment of the optical head according to the invention is characterized by the input grating having a correction for a non-circular cross-section of the radiation beam, in that the periodic grating structure only covers a surface having the size of the cross-section of the radiation beam at the location of the input grating. The input grating is as large as the cross-section of the radiation beam so that there is no input grating structure outside this cross-section which only contributes to radiation loss.

A further embodiment is characterized by the input grating having a correction for astigmatism of the radiation beam, because the periodic grating structure comprises non-circular grating lines in which the grating period is different in two directions which are perpendicular to each other. When an astigmatic beam is incident on a non-adapted input grating, a part of the radiation in the beam will not reach the waveguide. By adapting the grating pattern, a beam having a given quantity of astigmatism can be optimally coupled into the waveguide.

A further embodiment is characterized in that the input grating and the output grating have a correction for wavelength variations of the radiation beam, in which the input grating and the output grating are each divided into n groups of m identical sectors which are associated with each other and are located symmetrically with respect to each other, in which the corresponding groups of sectors of the two gratings form part of a radiation path for a beam having a given wavelength of the radiation source, and in which n and m are integers which are larger than one. A specific wavelength is only coupled in by the sectors of that group which is optimized for this wavelength. If the laser wanders off to a different wavelength, another group will ensure the coupling. As a result, the wavelength range in which the gratings function properly can be extended considerably.

The output grating may be designed in such a way that it does not only couple radiation out of the waveguide but also focuses the scanning beam on the surface to be scanned. However, the requirements which must be imposed on the output grating can be alleviated considerably if, in accordance with a further characteristic feature, a lens is arranged in the optical path of the scanning beam. The gratings now only need to change the direction of the radiation through a small angle because at least a part of the beam is focused by the lens.

Embodiments of the invention will be described in greater detail with reference to the accompanying drawings.

DESCRIPTION OF THE PREFERRED EMBODIMENTS

Figure 1:
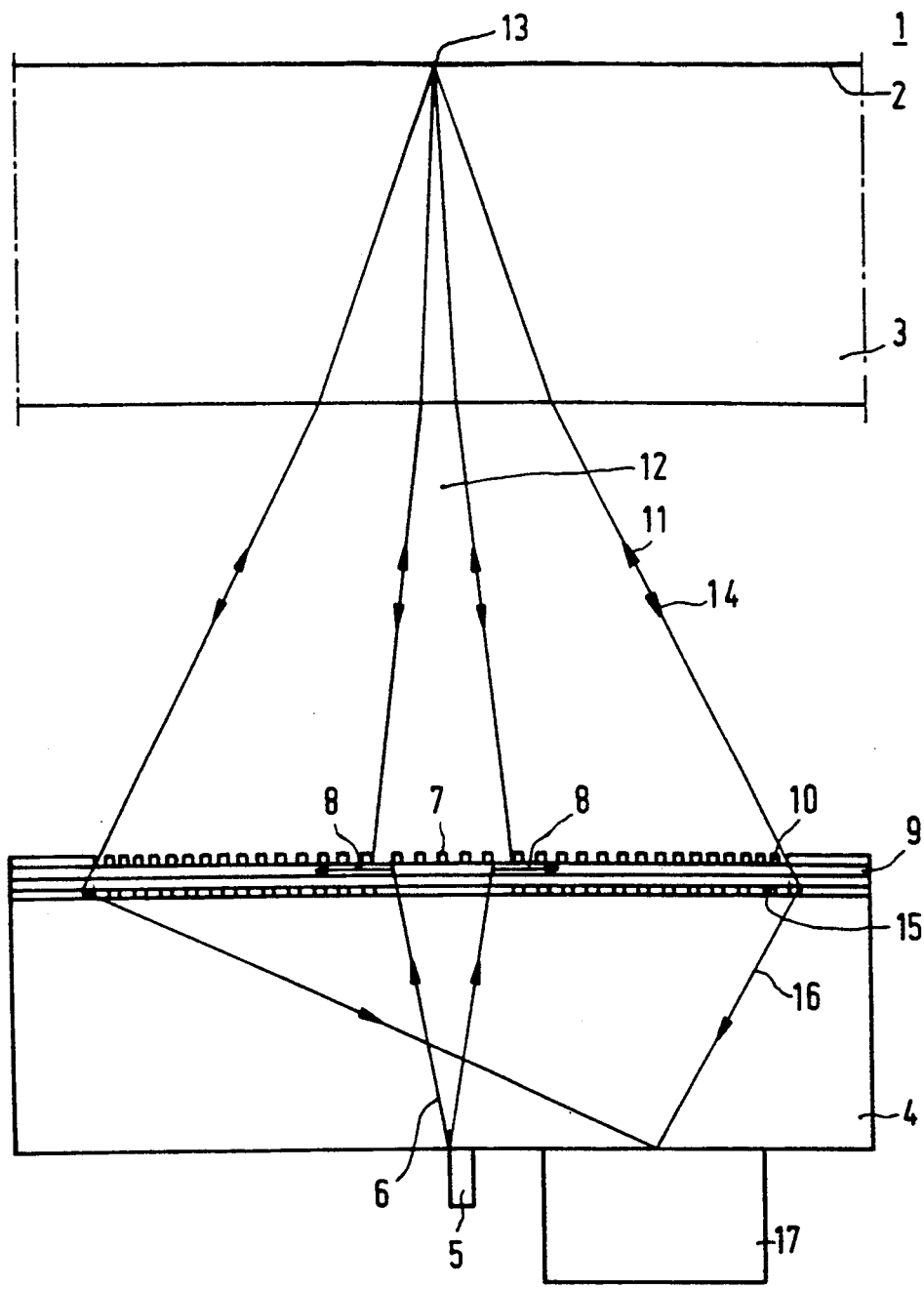
FIG. 1 shows an embodiment of the optical head.

FIG. 1 shows an optical head and an optical record carrier in a cross-section. The record carrier 1 has a reflecting recording surface 2 on a transparent carrier 3. The optical head comprises a transparent substrate 4 on which all components may be secured. A radiation source 5 is mounted on the lower side of the substrate. The radiation source is preferably a laser diode. A radiation beam 6 from the source passes through the substrate 4 towards an input grating 7. This grating converts the upgoing beam 6 into a horizontal beam 8 which propagates through a waveguide 9. The waveguide is a thin layer of material having a refractive index which differs from that of the layers enclosing the waveguide in such a way that a radiation beam is trapped in the waveguide. The radiation in the waveguide spreads radially towards the edge of the substrate 4. An output grating 10 coupling radiation out of the waveguide and converting it into, for example, a converging scanning beam 11 is directly arranged on the waveguide 9. The scanning beam 11 is focused to a scanning spot 13 on the recording surface 2. The centre 12 of the scanning beam does not comprise any radiation due to the presence of the input grating 7. This does not have any great influence on the quality of the scanning spot, because the surface of the centre 12 is small as compared with the cross-section of the scanning beam 11 and because the area 12 is located in the centre of the scanning beam. After reflection on the recording layer, the scanning beam returns to the substrate 4.

A part of the radiation in the reflected beam 14 will enter the substrate through the output grating 10. An extra detector grating 15 deflecting the reflected radiation into a detector beam 16 incident on a detection system 17 may be arranged underneath the output grating. Like the radiation source 5, the detection system may be mounted on the lower side of the substrate 4. In addition to a signal which is representative of the information which has been read, the detection system may also supply a signal representing a tracking error and/or a signal representing a focus error.

The radiation beam 6 may have deficiencies detrimentally influencing the operation of the input grating 7. There are different methods of improving the radiation beam. The frequently elliptical shape of the radiation beam can be corrected by means of a prism or by obliquely positioning the radiation source under the input grating, as described in European Patent Application no. 0,195,657. An oblique plane-parallel plate or a cylindrical lens may compensate for astigmatism in the radiation beam. A drawback of these elements is that they have to be arranged between the radiation source 5 and the substrate 4. Consequently, it is no longer possible to mount the radiation source directly on the substrate. By providing the required corrections in the input grating 7 in accordance with the invention, the number of components in the optical head is reduced and it is possible to make a compact head which can be aligned in a simple manner.

Figure 2A:
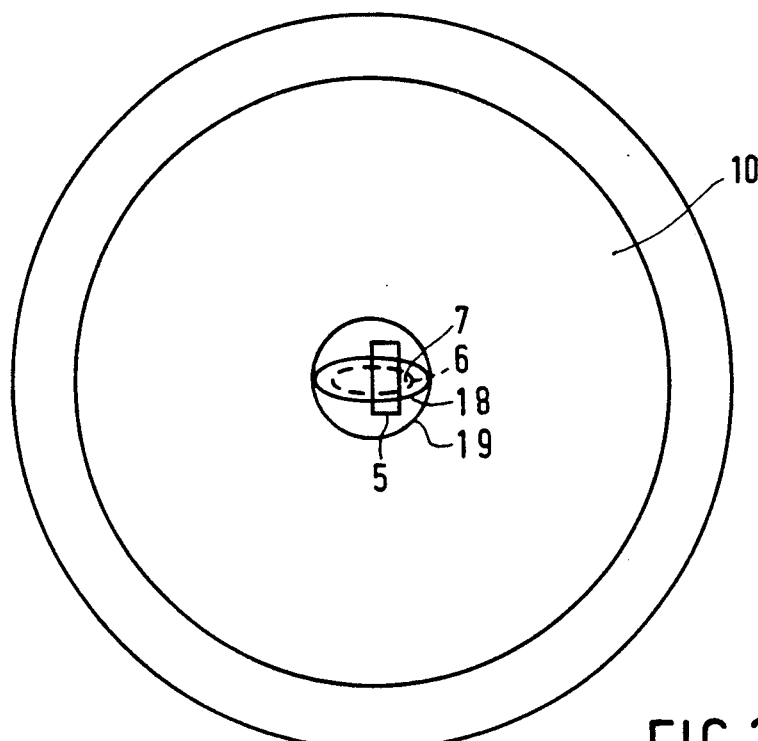
FIG. 2a is a plan view of the input grating and the output grating.

FIG. 2a is a plan view of the input grating 7 and the radiation source 5. In this Figure it has been assumed that the cross-section of the radiation beam 6 at the location of the input grating 7 is elliptical. The grating structure of the input grating is only located within this ellipse and is possibly several tenths of millimeters larger so as to compensate for radiation source tolerances. The output grating 10 may directly start at the outer edge 18 of the input grating or on a circle 19 enclosing the input grating. The waveguide 9 extends from the centre of the input grating to the outer edge of the output grating.

Figure 2B:
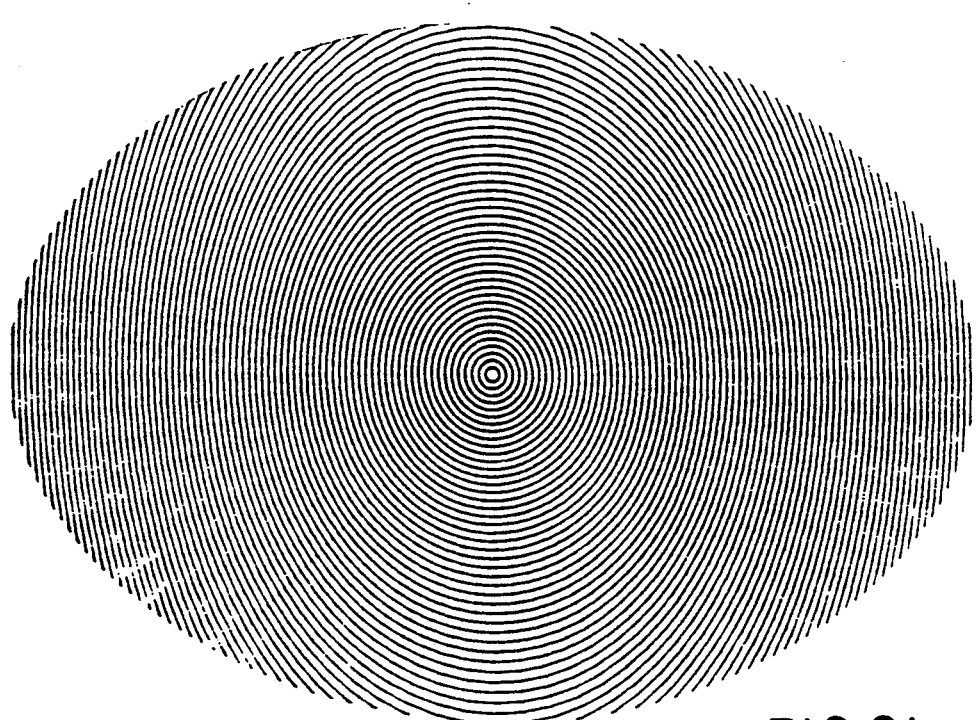
FIG. 2b shows an input grating for an astigmatic beam having an elliptical cross-section.

If the radiation beam 6 is astigmatic and if it is nevertheless to be coupled into the waveguide 9 correctly, the grating structure of the input grating 7 may be adapted in accordance with the invention by making the grating lines non-circular. An example of such a grating is shown in FIG. 2b. This Figure only shows several grating lines for the sake of clarity. In this example the grating lines are slightly elliptical to allow an astigmatic beam to be coupled in. The extent of ellipticity depends on the quantity of astigmatism in the radiation beam 6. In the case of a more astigmatic radiation beam the shape of the grating lines will deviate from an ellipse. However, they retain the characteristic feature of the grating period being different in two perpendicular directions. The edge of the input grating is elliptical so as to capture a radiation beam 6 having a comparable cross-section.

As is known, the operation of a grating is dependent on the wavelength of the beam which must be influenced by this grating. Particularly in a diode laser a variation of the temperature of or the electric current through this laser may change the wavelength. A small wavelength change may already cause the quantity of radiation in the beam 8 coupled out of the diode laser beam 6 into the waveguide to decrease drastically. It could be considered to stabilize the wavelength of the laser by controlling the current and the temperature of the diode laser. A temperature control for a laser diode considerably complicates the construction of the optical head. According to the invention said problem can be evaded by rendering the optical path of the radiation source 5 via the recording layer 2 towards the detection system 17 suitable for different wavelengths. This can be realised by dividing the input grating 7, the output grating 10 and possibly a detector grating 15 into groups of sectors in which the sectors of each group are optimized for a given wavelength band.

Figure 3:
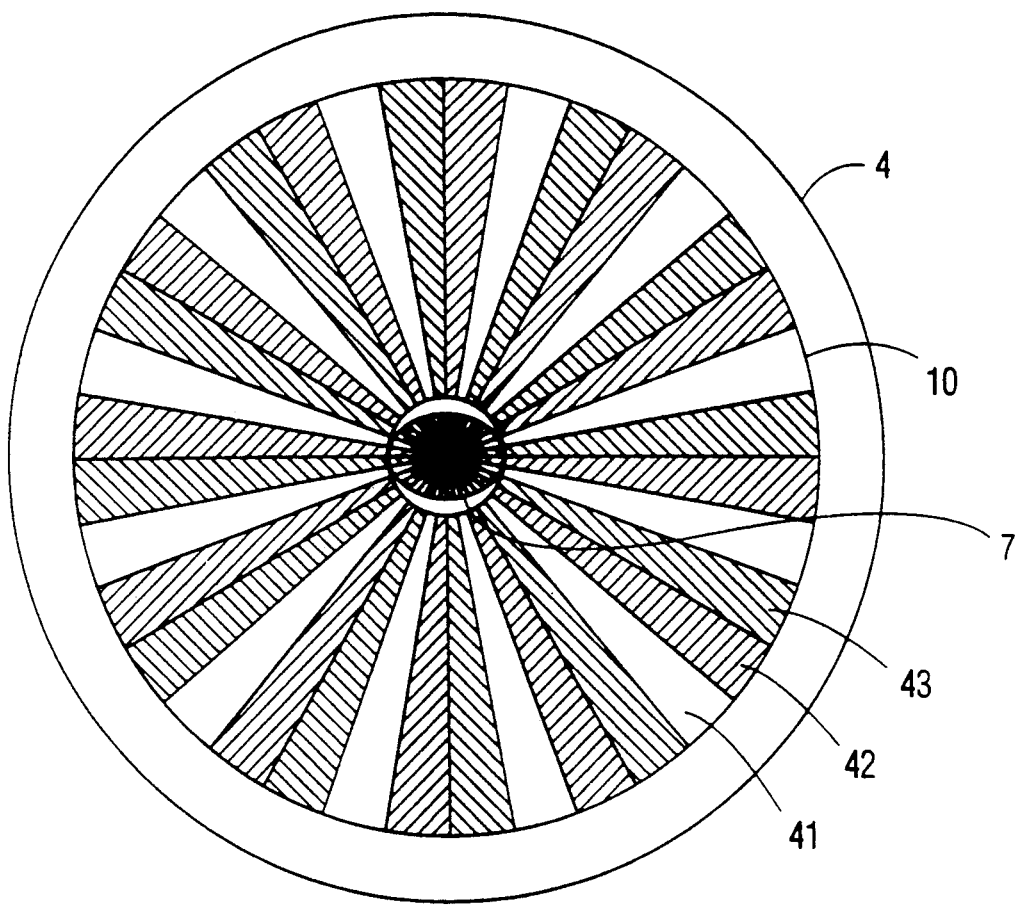
FIG. 3 shows an input grating divided into sectors.

A possible embodiment of an input grating and an output grating divided into sectors is shown in FIG. 3. This Figure shows the input grating 7 and the output grating 10 on the substrate 4. Each grating is divided into three groups of twelve sectors each. The group of blank first sectors 41 is optimized to focus radiation of a first wavelength from the radiation source 5 on the recording surface 2 via successively the input grating 7 and the output grating 10 and subsequently to guide this radiation towards the detection system 17 via a possible detector grating 15 which is divided in the same way as the gratings 7 and 10. Since diametrically opposite sectors in each grating have the same grating structure and since the associated sectors in the different gratings are superposed, an optical path of the radiation source 5 is formed for the associated wavelength via the input and output gratings 7,10 towards the recording surface 2 and subsequently towards the detection system 17 possibly via the detector grating 15. Analogously, a light path which is optimized for a second and a third wavelength is formed by means of the hatched second and third sectors 42 and 43, respectively. Radiation of the first wavelength does not reach the second and third sectors of the output grating 10, because the input grating 7 in these sectors of the pupil does not have the correct grating structure to couple the first wavelength out of the radiation source 5 into the waveguide 9. Consequently, each light path uses a third part of the surface of the gratings. The number of sectors in a grating for one wavelength must be determined with reference to the desired quality of the scanning focus 13. The spectral width of the radiation from the radiation source and its variation, and the wavelength-dependent behaviour of the gratings in the sectors determine the number of different wavelengths for which the gratings must be designed. The embodiment of FIG. 3 is optimized for three wavelengths. It will be evident that the division of the gratings into sectors is also possible in optical heads which do not comprise a detector grating but only an input grating and an output grating. An input grating and an output grating divided into sectors is also suitable for making two additional focus points which are offset in axial and opposite directions with respect to the focus point 13. A focus error can thereby be generated in accordance with the method which is known from said European Patent Application no. 0,357,780. If the diode laser 5 is a so-called multi-mode laser, a different wavelength may be used for each focus point.

Figure 4:
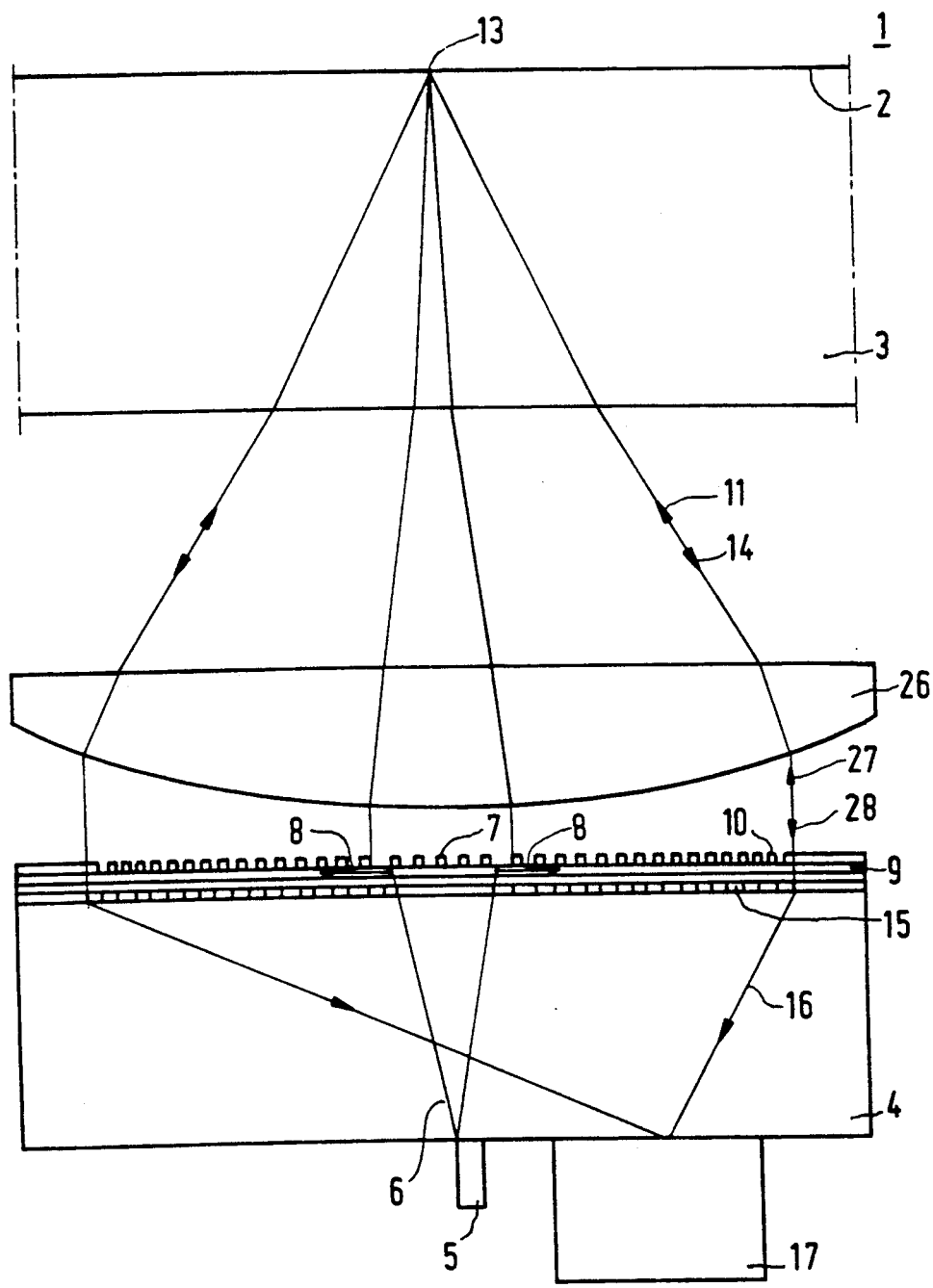
FIG. 4 shows an optical head provided with a lens.

In the optical head of FIG. 1 the output grating 10 and possibly a detector grating 15 must deflect the radiation through a large angle. Strict tolerances requirements must then be imposed on these gratings. By providing a lens 26, as is shown in FIG. 4, which takes care of at least a part of the deflection, the gratings need only deflect through small angles so that the tolerance requirements for these gratings can be alleviated. The output grating 10 in FIG. 4 only needs to form a beam 27 going straight up from the radiation 8 in the waveguide 9, instead of a converging beam 11 as in, for example, FIG. 1. It is even possible for the beam 27 to be a diverging beam so as to even further alleviate the requirements imposed on the output grating. The lens 26 transforms the beam 27 to a converging scanning beam 11 which is incident on the record carrier 1 with the desired numerical aperture. After reflection on the recording surface 2, the lens 26 forms a beam 28 which, after transmission by the output grating 10, is deflected as detector beam 16 towards the detection system 17 by the detector grating 15. The change of direction between the beams 28 and 26 is smaller than between the beams 14 and 16 in FIG. 1 in which no use is made of a lens. Consequently, the tolerance requirements for the detector grating 15 of FIG. 4 are not as strict as those for the same grating of FIG. 1. The lens 26 may be a spherical lens in which the necessary corrections, for example, the spherical aberration correction for the scanning beam 11 are built in the output grating 10. It is alternatively possible for the lens 26 to be monoaspherical or biaspherical so that corrections can be performed by the lens itself. The lens 26 may be used in any optical head with an output grating 10, independent of the fact whether it comprises a detector grating 15.

Figure 5:
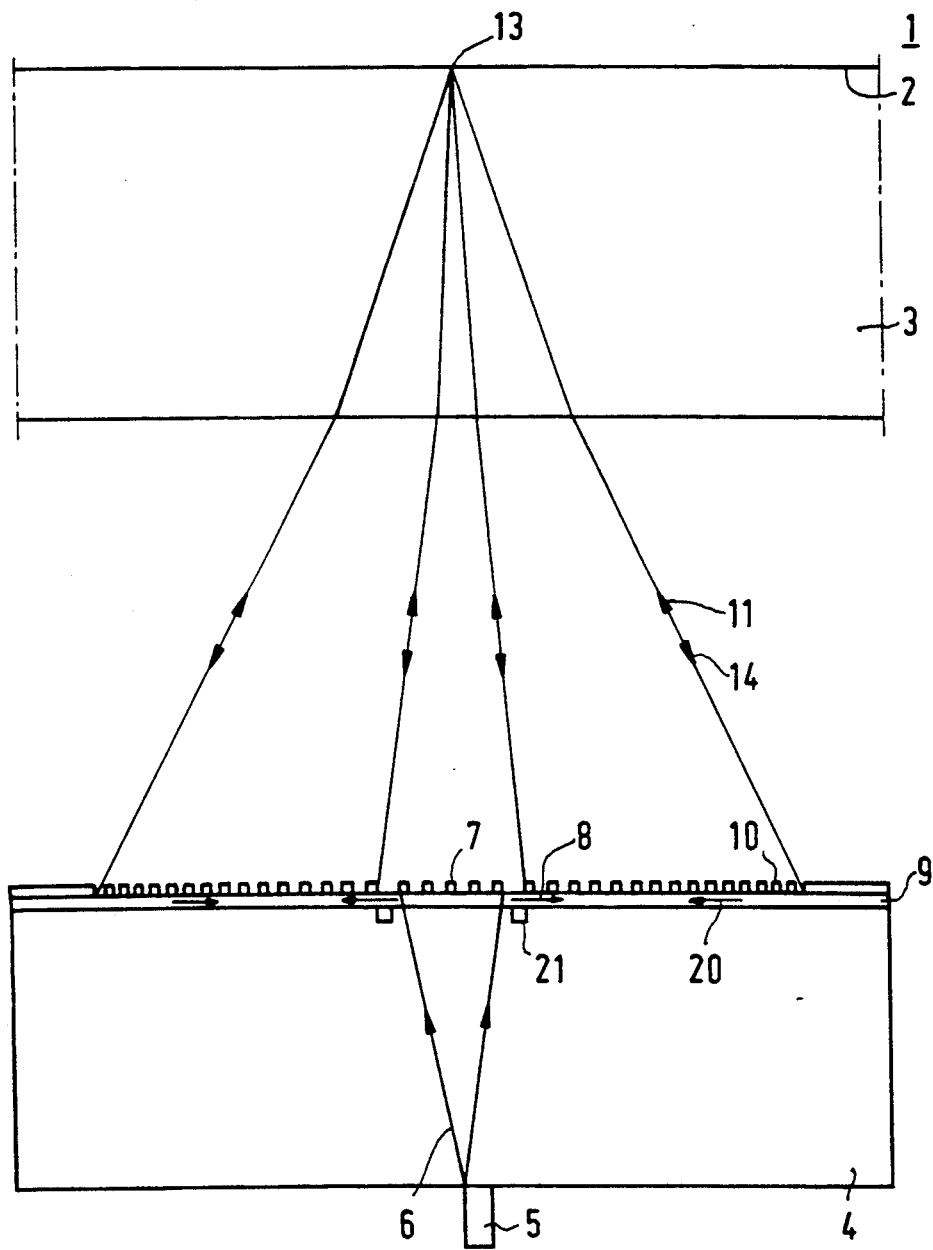
FIG. 5 shows an optical head with a circular detection system.

The use of the invention is not limited to a scanning head with a detector at the lower side of the substrate. The invention may also be used, for example, in the optical head shown in FIG. 5. The principle of this optical head is known from the previously mentioned European Patent Application no. 0,357,780. A part of the beam 14 reflected by the record carrier 1 will be coupled into the waveguide 9 by the output grating 10 and will converge as a horizontal beam 20 towards the center of the substrate. An annular detection system 21, which is coupled to the waveguide in such a way that instead of the radiation of beam 8 the radiation of beam 20 is mainly guided towards the detection system, is arranged underneath the waveguide 9. The input grating 7 may have one or more of the properties of the input grating of FIG. 1, i.e. a non-circular edge, coupling in an astigmatic beam and/or divided into sectors.

The invention is described with reference to an optical head for scanning a recording surface in an optical record carrier. It will be evident that the invention can also be used for writing information into recording layers. The optical head according to the invention can also be used in apparatuses for inspecting surfaces in which, for example, contours in a surface are scanned. An example of such an apparatus is a scanning microscope.

I claim:

1. An optical head for scanning a surface, which head is provided with a source supplying a radiation beam, an input grating having a periodic grating structure for coupling the radiation beam as a deflected beam into a waveguide, and an output grating for coupling radiation out of the waveguide and for directing said radiation in the form of a scanning beam onto the surface, characterized in that the input grating is configured to provide at least one correction for a deficiency of the radiation beam.

2. An optical head as claimed in claim 1, characterized in that the input grating and the output grating are configured to provide a correction for wavelength variations of the radiation beam, in which the input grating and the output grating are each divided into n groups of m identical sectors which are associated with each other and are located symmetrically with respect to each other, in which the corresponding groups of sectors of the two gratings form part of a radiation path for a beam having a given wavelength of the radiation source, and in which n and m are integers which are larger than one.

3. An optical head as claimed in claim 2, characterized in that a lens is arranged in the optical path of the scanning beam.

4. An optical head as claimed in claim 1, characterized in that a lens is arranged in the optical path of the scanning beam.

5. An optical head for scanning a surface, comprising means for providing a radiation beam, a waveguide, an input grating having a periodic structure for coupling said radiation beam into said waveguide, and an output grating fro coupling radiation out of the waveguide and for directing said radiation as a scanning beam toward said surface,
characterized in that said grating structure deviates from a completely symmetrical circular grating structure, the deviation from complete circular symmetry correcting at least one deficiency of said radiation beam.

6. An optical head as claimed in claim 5, characterized in that a lens is arranged in the optical path of the scanning beam.

7. An optical head as claimed in claim 5, characterized in that the input grating and the output grating are configured to provide a correction for wavelength variations of the radiation beam, in which the input grating and the output grating are each divided into n groups of m identical sectors which are associated with each other, in which the correponding groups of sectors of the two gratings form part of a radiation path for a beam having a given wavelength of the radiation source, and in which n and m are integers which are larger than one.

8. An optical head as claimed in claim 7, characterized in that a lens is arranged in the optical path of the scanning beam.

9. An optical head as claimed in claim 5, characterized in that the input grating has a correction for astigmatism of the radiation beam in that the periodic grating structure comprises non-circular grating lines in which the grating period is different in two directions which are perpendicular to each other.

10. An optical head as claimed in claim 9, characterized in that a lens is arranged in the optical path of the scanning beam.

11. An optical head as claimed in claim 9, characterized in that the input grating and the output grating are configured to a correction for wavelength variations of the radiation beam, in which the input grating and the output grating are each divided into n groups of m identical sectors which are associated with each other and are located symmetrically with respect to each other, in which the corresponding groups of sectors of the two gratings form part of a radiation path for a beam having a given wavelength of the radiation source, and in which n and m are integers which are large than one.

12. An optical head as claimed in claim 11, characterized in that a lens is arranged in the optical path of the scanning beam.

13. An optical head as claimed in claim 12, characterized in that a lens is arranged in the optical path of the scanning beam.

14. A head as claimed in claim 5, characterized in that said input grating structure comprises non-circular grating lines having a grating period different in two directions which are perpendicular to each other.

15. A head as claimed in claim 5, wherein said radiation beam has a non-circular cross-section, characterized in that said input grating structure covers a surface having the size of said cross-section at the location of the input grating.

16. An optical head as claimed in claim 15, characterized in that the input grating and the output grating are configured to provide a correction for wavelength variations of the radiation beam, in which the input grating and the output grating are each divided into n groups of m identical sectors which are associated with each other and are located symmetrically with respect to each other, in which the corresponding groups of sectors of the two gratings form part of a radiation path for a beam having a given wavelength of the radiation source, and in which n and m are integers which are larger than one.

17. An optical head as claimed in claim 16, characterized in that a lens is arranged in the optical path of the scanning beam.

* * * * *